United States Patent Office 3,377,922
Patented Apr. 16, 1968

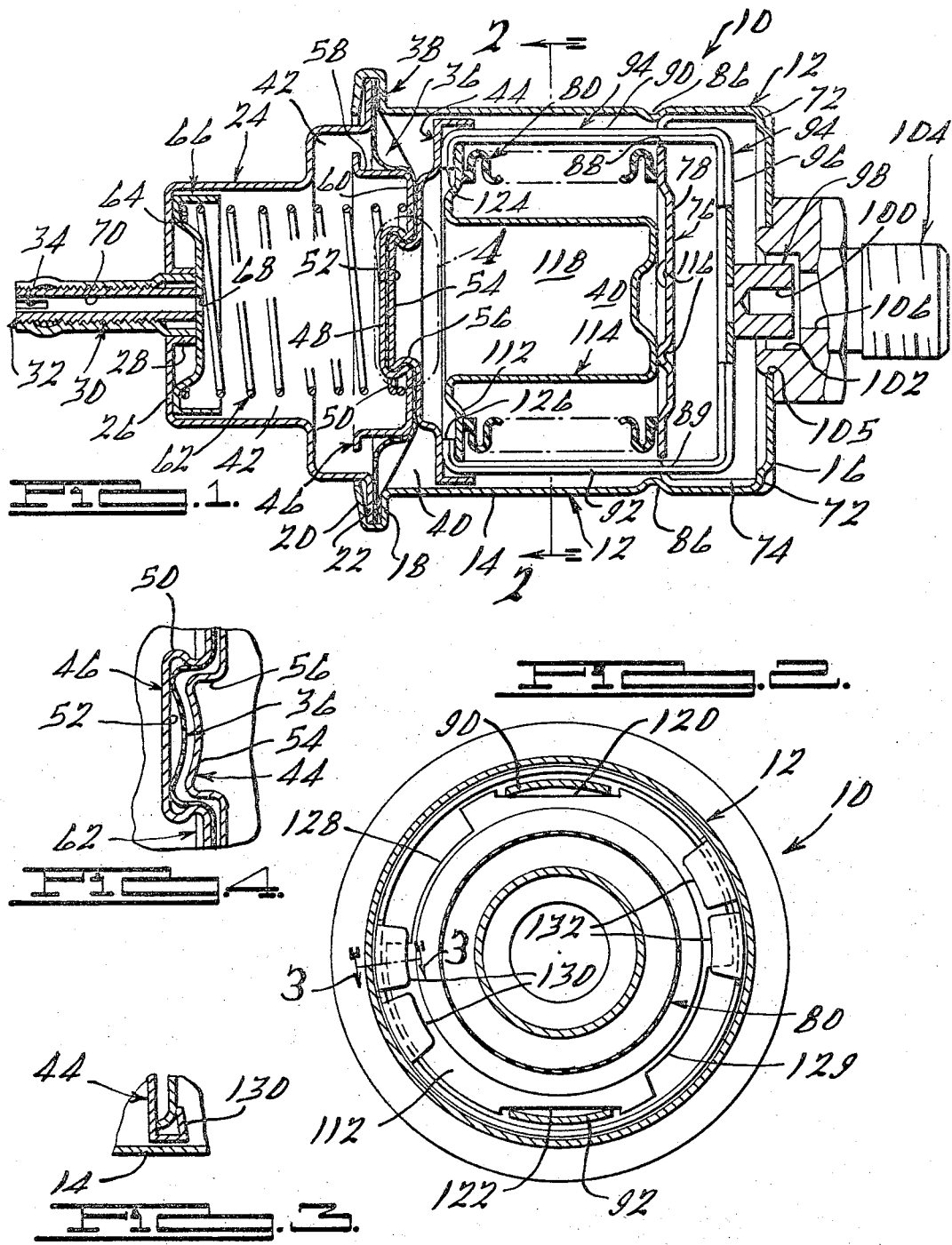

3,377,922
AMBIENT PRESSURE COMPENSATED TRANSMISSION THROTTLE VALVE CONTROL
Donald L. Spender, Cheshire, and Gray L. Butler, Terryville, Conn., assignors to Scovill Manufacturing Company, Waterbury, Conn., a corporation of Connecticut
Filed Aug. 30, 1965, Ser. No. 483,537
2 Claims. (Cl. 92—36)

ABSTRACT OF THE DISCLOSURE

Ambient pressure compensated transmission throttle valve control having a precalibrated bellows subassembly and having an improved means for supporting and reinforcing the diaphragm.

---

This invention relates generally to a transmission throttle valve control for automatic vehicle transmissions and, more particularly, to an improved ambient pressure compensated transmission throttle valve control.

It is conventional in the automatic transmission art to utilize a throttle valve to vary line pressure in the transmission control system as a function of engine torque which is sensed as a function of engine intake manifold pressure. It is equally well known, however, that control of transmission line pressure solely as a function of engine intake manifold pressure may result in undesirable transmission operating characteristics when the engine is operated through a widely varying range of ambient pressures. For example, operation of an engine in relatively low ambient pressures results in a loss of engine manifold pressure which causes the transmission to change drive ratios at different "shift points" than when operating at normal ambient pressures.

This problem has been heretofore solved by an ambient pressure compensating throttle valve control that functions to correct for the reduction in engine intake manifold pressure experienced under low ambient pressure conditions. The bias of the control on the throttle valve of the transmission is adjusted to maintain a normal range of line pressures and therefore the normal "shift points" of the transmission.

However, such heretofore known and used throttle valve controls have a number of limitation both in production and field use. For example, such known modulators are required to be calibrated after assembly, materially increasing the difficulty of calibration and therefore the cost of the control. Furthermore, such heretofore known and used throttle valve controls are susceptible to leakage which may result in unreliable operation or failure.

A transmission throttle valve control in accordance with the instant invention is relatively simple to manufacture and exhibits an operating life and reliability considerably in excess of such controls heretofore known and used.

The control of the instant invention features a non-perforated, leakproof diaphragm assembly, wherein a rubberized fabric diaphragm is sealingly retained in a partly collapsed condition. The diaphragm is reinforced by members on opposite sides thereof which are mechanically locked thereto without bonding or riveting. Thus, the diaphragm assembly is not subject to failure due to failure of a bonding material or to leakage through rivet holes.

In accordance with another feature of the instant invention, a bellows sub-assembly is precalibrated before assembly within the control housing. After the sub-assembly is assembled into the control housing no further calibration or adjustment is required, the sub-assembly being simply staked in place by a plurality of nibs in the housing side wall. This is a significant advance over transmission throttle valve controls heretofore known and used which require calibration subsequent to assembly with an outer housing.

Accordingly, one object of the present invention is an improved ambient pressure compensated transmission throttle valve control.

Another object is an ambient pressure compensated transmission throttle valve control comprising a precalibrated sub-assembly.

Another object of the present invention is an improved means for supporting and reinforcing the diaphragm of an ambient pressure compensating transmission throttle valve control to maximize the strength thereof and to preclude leakage therethrough.

Another object of the present invention is an ambient pressure compensating throttle valve control which is easy to assemble and economical to manufacture.

Other objects and advantage of the present invention will be apparent in the following detailed description, claims and drawing, wherein:

FIGURE 1 is a longitudinal cross sectional view of an exemplary embodiment of the ambient pressure compensating transmission throttle valve control of the present invention;

FIG. 2 is a transverse cross sectional view of the structure illustrated in FIGURE 1, taken along the line 2—2 thereof;

FIG. 3 is a fragmentary cross sectional view taken along the line 3—3 of FIGURE 2; and FIG. 4 is a view of the structure within the circle "4" of FIG. 1 prior to assembly.

The throttle valve control of the present invention corrects for the reduction in engine intake manifold pressure experienced at low ambient pressures to maintain the displacement of the transmission throttle valve independent of variations in ambient pressure. Thus, line pressure to the transmission governor is maintained relatively constant for a given engine torque condition. More particularly, a sealed bellows, that has been evacuated to a vacuum of, for example, 25 inches of Hg is tensioned so that the contractile force thereof exerts a bias on a diaphragm in opposition to the force exerted by a pressure differential thereacross. As ambient pressure decreases, the bellows expands thereby decreasing the bias thereof on the diaphragm. Thus, the net force acting on the diaphragm is independent of variations in ambient pressure.

A particular feature of the throttle valve control of the instant invention resides in the fact that the bellows sub-assembly is precalibrated prior to assembly and merely staked within a body shell. After the bellows sub-assembly has been mounted within the body shell only minor adjustment is required.

Further, the diaphragm is secured to the bellows sub-assembly in a unique manner that is more positive than adhesives, yet obviates the heretofore required rivets, screws, etc.

Referring now to the drawing, an ambient pressure compensated transmission throttle valve control 10 in accordance with an exemplary embodiment of the present invention, comprises a cylindrical body shell 12 having an annular side wall portion 14 that terminates, at one end, in a radially inwardly extending end wall portion 16. The opposite end of the side wall portion 14 is formed with a radially outwardly extending retaining flange 18 having an outer peripheral portion 20 adapted to be crimped radially inwardly over an annular flange section 22 on one end of a generally cup-shaped cover member 24, thereby to fixedly secure the members 12 and 24 together.

The cover member 24 is formed with a radially inwardly extending end wall 26 having an annular inwardly extending sleeve portion 28 coaxially aligned with the longitudinal axis of the body shell 12. The sleeve portion 28 is adapted to support one end of a cylindrical calibration tube 30 that is internally threaded and is secured within the sleeve portion 28 as by soldering or the like.

Threadedly mounted within the calibration tube 30 is an axially movable, hollow calibration screw 32 which is formed with a screw driver receiving slot 34 in its outer end. The screw 32 is axially adjustable relative to the tube 30, as will be described.

A flexible diaphragm 36, which is preferably a rubber coated nylon fabric or similar impervious, flexible and deformable material, extends transversely of the body shell 12 and cover member 24 and has its outer peripheral edge secured between the flange sections 18 and 22 of the shell 12 and cover 24, respectively. The diaphragm 36 functions to divide the control 10 into two separate chambers; namely, a relatively high pressure chamber 40 defined by the body member 12 and diaphragm 36, and a relatively low pressure chamber 42 defined by the cover member 24 and the diaphragm 36. It will be noted that the flange 18 is formed with an annular axially extending embossment 38 that engages one side of the outer peripheral edge of the diaphragm 36 upon assembly of the members 12, 24 and 36, thereby to assure a fluid pressure-tight seal at the juncture of these members.

A locking shell or reinforcing member 44 and a spring shell or reinforcing member 46 are disposed on opposite sides of the diaphragm 36 within the chambers 40 and 42, respectively. The shell 46 is formed with a circular, central, axially offset portion 48 having an annular peripheral fold 50 of S-shaped cross section within which a complementary circular offset portion 54 and S-shaped fold 56 of the locking shell 44 is interlocked. Upon assembly, the portions 48 and 54 of the members 46 and 44 are pressed together forming the annular S-shaped interlock and mechanically securing the diaphragm 36 therebetween in a manner capable of transmitting relatively high axial tensile as well as compressive loads.

A particular feature of the aforesaid construction resides in the fact that the shell members 44 and 46 are positively connected to one another and to the diaphragm 36 without the use of any rivets, screws, or the like so that there are no openings or passages in the diaphragm 36 susceptible of leakage. Still another feature of this construction is that the axial offsets of the portions 54 and 48 are relatively small and, because the diameters of the portions 54 and 48 are such that the S-shaped folds 50 and 56 are disposed substantially equidistant between the central axis of the members 44 and 46 and the outer periphery thereof, the folds 50 and 56 structurally rigidify said members.

The shell member 46 has an axially extending flange 58 which defines an annular recess 60 for the acceptance of one end of a helical coil spring 62. The opposite end of the spring 62 is nested within an annular recess 64 defined by a generally cup-shaped adjustment plate 66. The plate 66 is formed with a central opening 68 that is axially aligned with a bore 70 formed in the adjustment screw 32. The plate 66 is positioned by the inner end of the adjustment screw 32. It will be seen that the bias exerted against the shell member 46 and thus against the diaphragm 36 may be increased by advancing the adjustment screw 32 axially of the tube 30.

The end wall 16 of the body shell 12 is formed with four circumferentially spaced embossments 72 for the support of an annular side wall portion 74 of a generally cup-shaped stationary shell 76. The stationary shell 76 has a transversely extending portion 78 which serves as an end closure for a bellows 80, the bellows 80 being secured to the transverse portion 78 of the shell 76 as by soldering.

The stationary shell 76 is rigidly secured in the position illustrated in FIGURE 1 by means of a plurality of circumferentially spaced radially inwardly projecting nibs 86 that are formed in the side wall section 14 of the body member 12 adjacent the transverse portion 78 of the member 76.

The platform portion 78 of the shell 76 is formed with a pair of diametrically opposed apertures 88 and 89 through which extend a pair of axially extending leg portions 90 and 92, respectively, of a generally U-shaped stirrup member 94. The stirrup 94 has a transversely extending portion 96 which is disposed between the platform 78 of the stationary shell 76 and the end wall 16 of the shell 12. Rigidly secured, as by soldering or the like, to the outer face of the portion 96 of the stirrup member 94 is an annular collar 98 having a central bore 100 for the acceptance of a transmission throttle valve stem (not shown). The collar 98 extends into a counterbore 102 in a fluid fitting 104 which, in turn, is secured within an aperture 105 in the end wall 16 of the body 12. The counterbore 102 communicates with the chamber 40 as well as with a central bore 106 that extends through the fitting 104.

The opposite end of the bellows 80 is secured to a radially outwardly projecting flange 112 on a generally cup-shaped moving shell 114, as by soldering. A portion of the moving shell 114 is disposed internally of the bellows 80 to define the inner and end walls thereof. In the absence of a pressure differential across the diaphragm 36, the shell 114 is seated on nibs 116 formed in the stationary shell 76.

As best seen in FIGURE 2, the flange section 112 of the moving shell 114 is formed with a pair of diametrically opposed cutout portions 120 and 122 which accommodate the leg portions 90 and 92 of the stirrup member 94. The ends of the leg portions 90, 92 have radially inwardly folded portions 124 and 126, respectively, which are interlocked with the flange 112 of the shell 114 to lockingly secure the stirrup member 94 and shell 114 together.

The flange section 112 of the movable shell 114 is also formed with a pair of diametrically disposed cutout portions 128 and 129 which accommodate two pairs of radially inwardly projecting tabs 130 and 132, respectively, that are formed on the locking shell 44.

As best seen in FIGURES 2 and 3, the bellows subassembly comprising the diaphragm 36, reinforcing members 44 and 46, stirrup 94, stationary shell 76, bellows 80 and movable shell 114 constitutes a precalibrated assembly. Precalibration of the bellows subassembly is effected by utilizing a spring 62 of known force characteristics in combination with an evacuated bellows 80 of known force characteristics. Since the bellows 80 is of known force capabilities and the compressive force of the spring 62 has also been pre-established, the degree of bias exerted by both during subsequent deflection of the interposed and connected diaphragm 36 will also be known. The resultant force is a function of the position of the diaphragm 36 as caused by a variable vacuum acting on one side of it.

The precalibrated bellows sub-assembly is inserted into the outer shell 12 until the side wall portion 74 of the stationary shell 76 seats on the transversely extending embossments 72. Thereafter, the detents 86 are impressed in the side wall 14 of the shell 12 to positively lock the bellows sub-assembly in position.

The bellows sub-assembly is assembled by first interlocking the legs 90 and 92 of the stirrup 94 with the flange 112 of the movable shell 114. Thereafter, the diaphragm 36, the locking shell 44 and spring shell 46 are radially oriented relative to the bellows 80 so that the ears 130 and 132 on the locking shell 44 are aligned with cutouts 128 and 129 in the movable shell 114. Thereafter the diaphragm 36 is advanced axially toward the bellows 80 and rotated approximately 60 degrees to bring the tab portions 130 and 132 on the shell 44 into locking engagement behind the flange 112 of the movable shell 114, as illustrated in FIGURE 2. It will thus be seen that the tab portions 130 and 132 cooperate with the flange 112 of the shell 114 to form a bayonet type locking arrangement for securing the aforesaid elements of the bellows sub-assembly.

The cover 24, spring plate 66 and spring 62 are assembled with the shell 12 by folding the flange 20 on the shell 12 about the flange 22 on the cover 24 and peripheral edge of the diaphragm 36.

In operation, the collar 98 is connected to the stem of an associated transmission throttle valve (not shown). Thereafter, the tube 30 of the control 10 is connected to the engine intake manifold, as by tubing (not shown). When the engine of the vehicle is not being operated there is no pressure differential across the diaphragm 36 as shown in FIG. 1.

When the vehicle engine is started, pressure in the chamber 42 decreases due to the reduction of pressure in the intake manifold of the engine. When a predetermined depression is reached the pressure differential across the diaphragm 36 effects a displacement of the diaphragm 36 towards the low pressure chamber 42 against the compressive bias of the spring 62 and the tensile or contractile force of the bellows 80.

However, operation of the vehicle in a low ambient pressure environment results in a reduction of the pressure differential across the diaphragm 36 which in turn results in a reduced displacement of the diaphragm towards the chamber 42 which, if uncompensated, would result in a spurious variation in the displacement of the transmission control valve.

Compensation is effected by the aforesaid lowering of the contractile force of the bellows 80 resulting in a reduction of the net spring and bellows force on the diaphragm 36. The algebraic sum of all forces applied to the diaphragm 36 remains a function of engine torque requirements independent of varying ambient pressure. Thus, the position of the diaphragm 36 and therefore of the collar 98 which controls the transmission valve is not affected by variations in the pressure differential across the diaphragm 36 occasioned by changes in ambient pressure. Accordingly, line pressure to the transmission governor is a constant for a given engine torque condition resulting in normal changes in drive ratios at all times.

It is to be understood that the specific construction of the improved throttle valve control herein disclosed and described is presented for the purpose of explanation and illustration and is not intended to indicate limits of the invention, the scope of which is defined by the following claims.

What is claimed is:

1. A fluid operated valve control comprising,
a cylindrical housing; an imperforate, flexible, relatively thin diaphragm dividing said housing into relatively high and low pressure chambers and movable longitudinally thereof in response to variations in the pressure differential therebetween,
a pair of relatively thin circular axially aligned sheet metal reinforcing members having annular, generally planar radially outer portions disposed on opposite sides of said diaphragm,
means for stiffening and interlocking said reinforcing members to one another and to said diaphragm comprising an annular rib of generally S-shaped radial cross section on each of said reinforcing members, said S-shaped ribs being spaced radially outwardly from the central axis thereof a distance substantially equal to one-half the radial dimension of said reinforcing members, said S-shaped ribs being nested in relation so as to transmit axially directed forces to one another and to said diaphragm, the axially outer face of the center portion of one of said reinforcing members being axially displaced toward the other reinforcing member beyond the plane of the axially outer face on the radially outer portion thereof, resilient means normally biasing said diaphragm toward said high pressure chamber,
a stationary shell having a portion positionable against the end wall of said housing shell and having a transverse portion spaced therefrom, a bellows having one end mechanically and sealably secured to the transverse portion of said stationary shell, and a movable shell mechanically and sealably secured to the other end of said bellows and defining a sealed chamber therewith, said bellows being mechanically connected to said diaphragm and responsive to variations in ambient pressure to vary the bias of said resilient means on said diaphragm in relation to variations in ambient pressure.

2. A valve control in accordance with claim 1 including,
a stirrup mechanically connected to said diaphragm and movable therewith, said stirrup having a portion disposed on the opposite side of the transverse portion of said fixed shell from the one end of said bellows for accepting one end of a transmission throttle valve.

References Cited

UNITED STATES PATENTS

| | | | |
|---|---|---|---|
| 2,548,004 | 4/1951 | Duefrene | 24—208.2 |
| 2,672,890 | 3/1954 | Bales | 92—135 X |
| 3,106,104 | 10/1963 | Harry. | |
| 3,258,984 | 7/1966 | Searles | 74—472 |
| 3,295,388 | 1/1967 | Groves | 74—472 |
| 3,302,534 | 2/1967 | Bauer et al. | 92—36 |

FOREIGN PATENTS 49,645 11/1934 Denmark.

MARTIN P. SCHWADRON, *Primary Examiner.*

I. C. COHEN, *Assistant Examiner.*